United States Patent
Brouwer

(10) Patent No.: US 10,076,962 B2
(45) Date of Patent: Sep. 18, 2018

(54) BRAKING CONTROL METHOD AND SYSTEM FOR A VEHICLE

(71) Applicant: Faraday & Future Inc., Gardena, CA (US)

(72) Inventor: Michael Lambertus Hubertus Brouwer, Los Gatos, CA (US)

(73) Assignee: FARADAY & FUTURE INC., Gardena, CA (US)

(*) Notice: Subject to any disclaimer, the term of this patent is extended or adjusted under 35 U.S.C. 154(b) by 0 days.

(21) Appl. No.: 15/210,044

(22) Filed: Jul. 14, 2016

(65) Prior Publication Data

US 2018/0015830 A1  Jan. 18, 2018

(51) Int. Cl.
*B60L 7/26* (2006.01)
*B60T 8/32* (2006.01)

(52) U.S. Cl.
CPC .......... *B60L 7/26* (2013.01); *B60T 8/321* (2013.01); *B60T 8/3275* (2013.01); *B60L 2240/12* (2013.01); *B60L 2250/26* (2013.01)

(58) Field of Classification Search
CPC ... A61B 18/14; A61B 18/1492; A61B 18/149; A61B 18/209; A61B 18/08021; A61B 2017/00269; A61B 2017/00296; A61B 17/3478; A61B 2017/306; A61B 2018/00196; A61B 2018/00291; A61B 2018/00488; A61B 2018/00494; A61B 2018/005; A61B 2018/00535; A61B 2018/00029; A61B 2018/00607; A61B 2018/00982; A61B 2018/1407; A61B 2018/141; A61B 2018/1412; A61B 2018/144; A61B 2018/00107; A61B 2018/0013; A61B 2018/00142; A61B 2018/00172; A61B 2018/00
See application file for complete search history.

(56) References Cited

U.S. PATENT DOCUMENTS

| | | | | |
|---|---|---|---|---|
| 6,126,251 | A * | 10/2000 | Yoshii | B60L 7/26 303/152 |
| 2013/0245906 | A1* | 9/2013 | Shirai | B60T 7/042 701/70 |
| 2014/0136069 | A1* | 5/2014 | Jung | B60T 13/662 701/70 |
| 2015/0266383 | A1* | 9/2015 | Kidston | B60L 7/26 701/70 |

* cited by examiner

*Primary Examiner* — Anne Marie Antonucci
(74) *Attorney, Agent, or Firm* — Lee & Hayes PLLC

(57) ABSTRACT

A braking control method and system are disclosed. According to certain embodiments, the method may include determining a target deceleration. The method may also include decelerating the vehicle by regenerative braking. The method may further include, when determining that an actual deceleration by the regenerative braking is below the target deceleration, applying friction braking in addition to the regenerative braking to achieve the target deceleration.

17 Claims, 4 Drawing Sheets

BRAKING CONTROL METHOD AND SYSTEM FOR A VEHICLE

TECHNICAL FIELD

The present disclosure relates generally to a braking control method and system for a vehicle, and more particularly, to a method and system for combining regenerative braking and friction brakes to achieve a target deceleration, so as to provide a consistent driving experience of the vehicle.

BACKGROUND

Regenerative braking, coupled with the recent technology advance in hybrid electric vehicles (HEVs) and electric vehicles (EVs), has drawn a lot of attention because of its potential in reducing fuel consumption and emission. Regenerative braking system (RBS) provides HEVs and EVs with capability to recover significant amount of energy during deceleration. For example, when a driver releases the accelerator pedal or depresses the brake pedal, the electric motors in an EV or HEV can be controlled to operate as generators to convert the kinetic and potential energy of the vehicle into electric energy. The recovered electric energy is stored in an energy storage system, typically a battery, for future use.

The amount of energy recoverable and thus the braking torque generated by the RBS are limited by many conditions, including the state of charge (SOC) of the energy storage system. When the SOC is approaching its upper limit, the charging current of the battery decreases and so does the amount of regenerative braking. Conversely, when the SOC is low, the RBS is capable of generating a greater braking torque and is used more frequently by the vehicle. This creates uneven driving experiences and even dangerous driving conditions as the same degree of depression of the accelerator pedal or brake pedal may create different vehicle decelerations at different SOCs. For example, if the driver operates the pedals based on her previous experience, accidents may result because the actual deceleration generated by the RBS may not match the driver's expected deceleration.

The disclosed braking control system is directed to mitigating or overcoming one or more of the problems set forth above and/or other problems in the prior art.

SUMMARY

One aspect of the present disclosure is directed to a computer-implemented method for decelerating a vehicle. The method may include determining a target deceleration. The method may also include decelerating the vehicle by regenerative braking. The method may further include, when determining that an actual deceleration by the regenerative braking is below the target deceleration, applying friction braking in addition to the regenerative braking to achieve the target deceleration.

Another aspect of the present disclosure is directed to a braking control device for a vehicle. The system may include a memory storing instructions. The system may also include a controller configured to execute the instructions to: determine a target deceleration; decelerate the vehicle by regenerative braking; and when determining that an actual deceleration by the regenerative braking is below the target deceleration, apply friction braking in addition to the regenerative braking to achieve the target deceleration.

Another aspect of the present disclosure is directed to a vehicle. The vehicle may include a regenerative braking system and a friction braking system. The vehicle may also include a memory storing instructions. The vehicle may further include a controller configured to execute the instructions to: determine a target deceleration; activate the regenerative braking system to decelerate the vehicle; and when determining that an actual deceleration achieved by the regenerative braking system is below the target deceleration, operate the friction braking system, in addition to the regenerative braking system, to achieve the target deceleration.

Yet another aspect of the present disclosure is directed to a non-transitory computer-readable medium storing instructions which, when executed, cause one or more processors to perform a method for decelerating a vehicle. The method may include determining a target deceleration. The method may also include decelerating the vehicle by regenerative braking. The method may further include when determining that an actual deceleration by the regenerative braking is below the target deceleration, applying friction braking in addition to the regenerative braking to achieve the target deceleration.

DETAILED DESCRIPTION

This disclosure is generally directed to a braking control method and system for generating a target deceleration for a vehicle. It is contemplated that the vehicle may be an electric vehicle, a fuel cell vehicle, a hybrid vehicle, or a conventional internal combustion engine vehicle. The vehicle may have any body style, such as a sports car, a coupe, a sedan, a pick-up truck, a station wagon, a sports utility vehicle (SUV), a minivan, or a conversion van. The vehicle may be configured to be operated by an operator occupying the vehicle, remotely controlled, and/or autonomous.

The vehicle may include both a RBS and a friction braking system for providing the necessary braking torque to decelerate the vehicle. In some embodiments, the vehicle may receive a request to decelerate the vehicle from an operator engaging an accelerator pedal or a brake pedal of the vehicle. The vehicle may determine a target deceleration corresponding to the request. When determining that the regenerative braking alone falls short to generate the target deceleration, the vehicle may supplement the regenerative braking with friction braking, to achieve the target deceleration.

Figure 1:
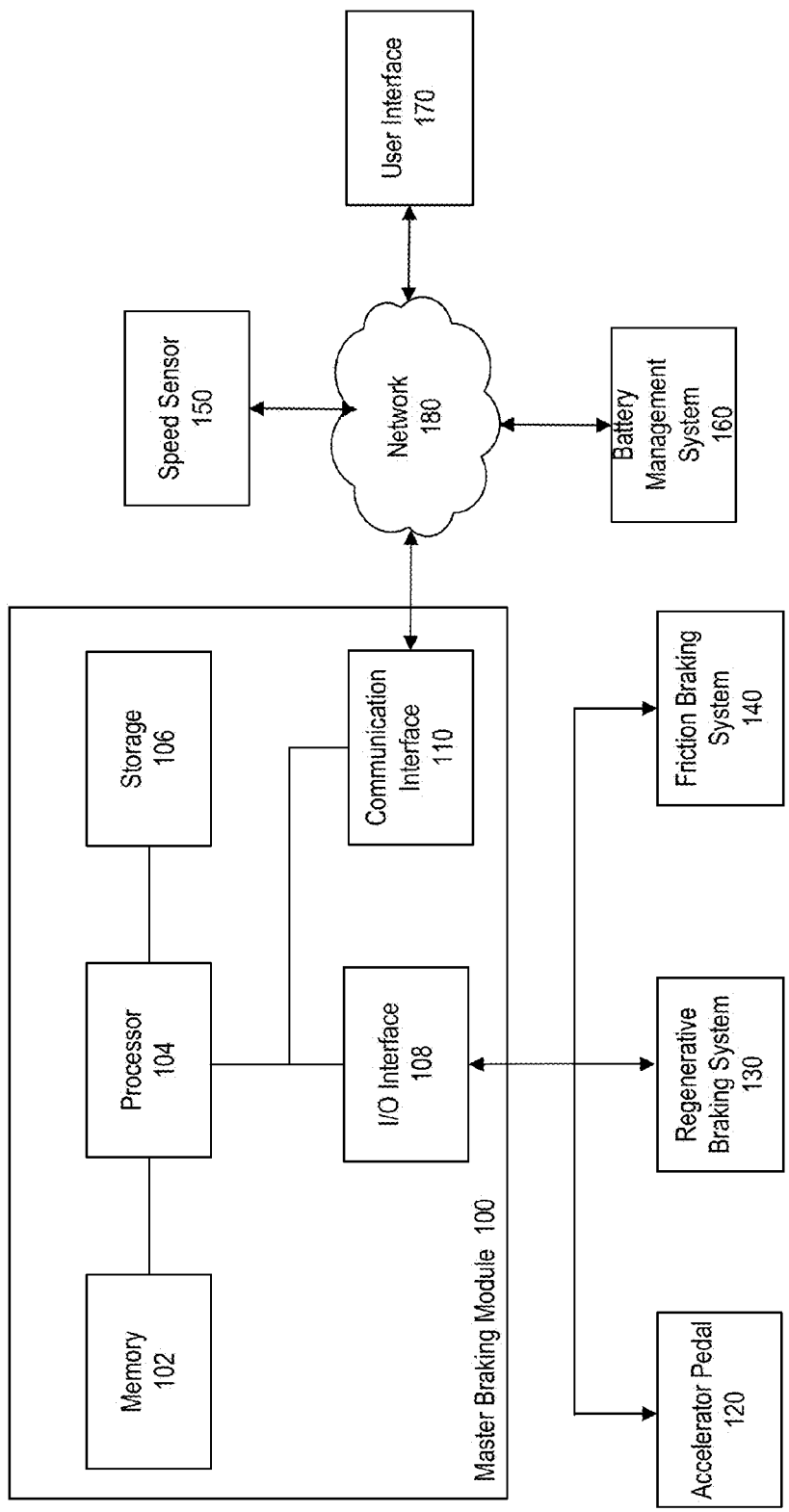
FIG. 1 is a block diagram of a braking control system for decelerating a vehicle, according to an exemplary embodiment.

FIG. 1 is a block diagram of a braking control system 10 employed by the above-described vehicle, according to an exemplary embodiment. Referring to FIG. 1, system 10 may include one or more of a master braking module 100, an accelerator pedal 120, a RBS 130, a friction braking system 140, a speed sensor 150, a battery management system (BMS) 160, a user interface 170, and a network 180.

The operator may depress or release accelerator pedal 120 to accelerate or decelerate the vehicle. Accelerator pedal 120 may be configured to generate a signal indicative of the position (hereinafter also referred to as "x") or the amount of depression (hereinafter also referred to as "$D_A$") of the pedal. In some embodiments, a threshold of the depression, $D_{coast}$, may be preset for accelerator pedal 120. If $D_A > D_{coast}$, the vehicle accelerates. If $D_A = D_{coast}$, the vehicle coasts, i.e., moves at a constant speed. Moreover, if $0 \leq D_A < D_{coast}$, the vehicle decelerates.

In exemplary embodiments, when $0 \leq D_A < D_{coast}$, system 10 may be configured to maintain a predetermined corresponding relationship between $D_A$ and the deceleration of the vehicle. That is, the same $D_A$ causes the vehicle to move at the same target deceleration. This way, system 10 may create a consistent driving experience for the operator. In one embodiment, the target deceleration is set to be inversely proportional to $D_A$, which makes it easy for the operator to build muscle memory about the pedal depression and the corresponding target deceleration. It is contemplated that the relationship between $D_A$ and the deceleration of the vehicle may be linear or non-linear.

Although the foregoing and the following description assumes that the operator decelerates the vehicle by reducing the amount of depression of accelerator pedal 120 below $D_{coast}$ or completely releasing accelerator pedal 120 (i.e., $D_A = 0$), it is contemplated that the operator may also decelerate the vehicle by depressing a brake pedal (not shown in FIG. 1), entering the target deceleration through a keyboard or touch screen, setting the target deceleration through voice or gesture commands. The disclosed method and system do not limit the ways of receiving a command for decelerating the vehicle.

In exemplary embodiments, RBS 130 is activated when $D_A$ is reduced below $D_{coast}$. RBS 130 converts the kinetic energy of the vehicle into another type of energy, for example, electric energy, instead of dissipating it as heat through friction brakes. The electric energy may be stored in an energy storage device, for example, a battery pack of the vehicle.

The amount of braking torque provided by RBS 130 is limited by many factors. In particular, one such limiting factor is the SOC of the battery pack. This is because the electric power generated by RBS 130 is determined by the battery voltage and the charging current that can be fed into the battery pack. Generally, when the SOC approaches its upper limit, the charging current decreases and thus the braking torque generated by the RBS 130 also decreases. Moreover, the internal resistance of the battery pack may rise exponentially when the SOC exceeds above certain level, e.g., 90%. In this case, RBS 130 needs to be disabled to avoid overheating or overcharging the battery pack.

For the above reasons, the disclosed embodiments supplement the regenerative braking with friction braking, in order to achieve the target deceleration corresponding to the amount of depression of accelerator pedal 120. Master braking module 100 may be used to distribute the required braking torque between RBS 130 and friction braking system 140. With continued reference to FIG. 1, master braking module 100 may include, among other things, a memory 102, a processor 104, a storage 106, an input/output (I/O) interface 108, and a communication interface 110. At least some of these components of master braking module 100 may be configured to transfer data and send or receive instructions between or among each other.

Processor 104 may include any appropriate type of general-purpose or special-purpose microprocessor, digital signal processor, or microcontroller. Processor 104 may be configured as a separate processor module dedicated to generating a target deceleration of the vehicle regardless of the battery SOC and/or the use of regenerative braking. Alternatively, processor 104 may be configured as a shared processor module for performing other functions unrelated to generating the target deceleration.

Processor 104 may be configured to receive data and/or signals from components of system 10 and process the data and/or signals to determine one or more conditions of the vehicle. For example, processor 104 may receive information relating to deceleration from accelerator pedal 120 via, for example, I/O interface 108. Processor 104 may also receive information relating to the SOC from BMS 160 via, for example, communication interface 110. Processor 104 may further generate and transmit a control signal for actuating one or more components of system 10, such as RBS 130 and friction braking system 140.

Processor 104 may execute computer instructions (program codes) stored in memory 102 and/or storage 106, and may perform functions in accordance with exemplary techniques described in this disclosure. More exemplary functions of processor 104 will be described later in relation to FIGS. 2, 3, 4A, and 4B.

Memory 102 and storage 106 may include any appropriate type of mass storage provided to store any type of information that processor 104 may need to operate. Memory 102 and storage 106 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 102 and/or storage 106 may be configured to store one or more computer programs that may be executed by processor 104 to perform exemplary braking control functions disclosed in this application. For example, memory 102 and/or storage 106 may be configured to store program(s) that may be executed by processor 104 to activate friction braking system 140, in addition to RBS 130, when determining that an actual deceleration generated by RBS 130 is below the target deceleration.

Memory 102 and/or storage 106 may be further configured to store information and data used by processor 104. For instance, memory 102 and/or storage 106 may be configured to store a lookup table indicative of a relationship between the amount of depression of accelerator pedal 120 and the corresponding target deceleration.

I/O interface 108 may be configured to facilitate the communication between master braking module 100 and other components of system 10. For example, I/O interface 108 may receive a signal generated by accelerator pedal 120 that indicates the amount of depression, and transmits the signal to processor 104 for further processing. I/O interface 108 may also output commands to RBS 130 and/or friction braking system 140 for producing the required braking torque.

Communication interface 110 may be further configured to communicate with speed sensor 150, BMS 160, and user interface 170 via network 180. Network 180 may be any type of wired or wireless network that may allow transmitting and receiving data. For example, network 180 may be a wired network, a local wireless network (e.g., Bluetooth™, WiFi, near field communications (NFC), etc.), a cellular network, an Internet, or the like, or a combination thereof. Other known communication methods which provide a medium for transmitting data are also contemplated.

Speed sensor 150 may be configured to generate a signal used by master braking module 100 to determine the change of velocity of the vehicle. For example, speed sensor 150 may be an odometer capable of measuring the number of rotations of a wheel or an axis of the vehicle, and generating a signal indicative of the speed of the vehicle. For another example, speed sensor 150 may be a GPS device that receives or determines speed information of the vehicle. For yet another example, speed sensor 150 may be an accelerometer configured to directly sense the acceleration/deceleration of the vehicle.

BMS 160 is associated with the battery pack and configured to manage the usage and charging of the battery pack in a safe and reliable manner In particular, BMS 160 may constantly monitor the SOC of the battery pack. For example, BMS 160 may monitor the output voltage of the battery pack, voltages of individual cells in the battery pack, current in and/or out of the battery pack, etc. BMS 160 may send information regarding the SOC to master braking module 100 for further processing. In some embodiments, BMS 160 may also be configured to monitor the state of health (SOH) of the battery pack, including the battery temperature. For example, when detecting that the battery pack is overheated, BMS 160 may send a warning signal to master braking module 100 for temporarily disabling RBS 130.

User interface 170 may be configured to receive input from the operator and transmit the input to master braking module 100. For example, user interface 170 may have a display including an LCD, an LED, a plasma display, or any other type of display, and provide a Graphical User Interface (GUI) presented on the display for user input and data display. User interface 170 may further include input devices, such as a touchscreen, a keyboard, a mouse, and/or a tracker ball. User interface 170 may be configured to receive user-defined settings. For example, the operator may reset, via user interface 170, the corresponding relationship between the amount of depression of accelerator pedal 120 and the target deceleration. In one embodiment, user interface 170 may be housed in the dashboard of the vehicle. In another embodiment, user interface 170 may be part of a mobile device, for example, a smart phone, that can wirelessly communicate with master braking module 100 via network 180.

Figure 2:
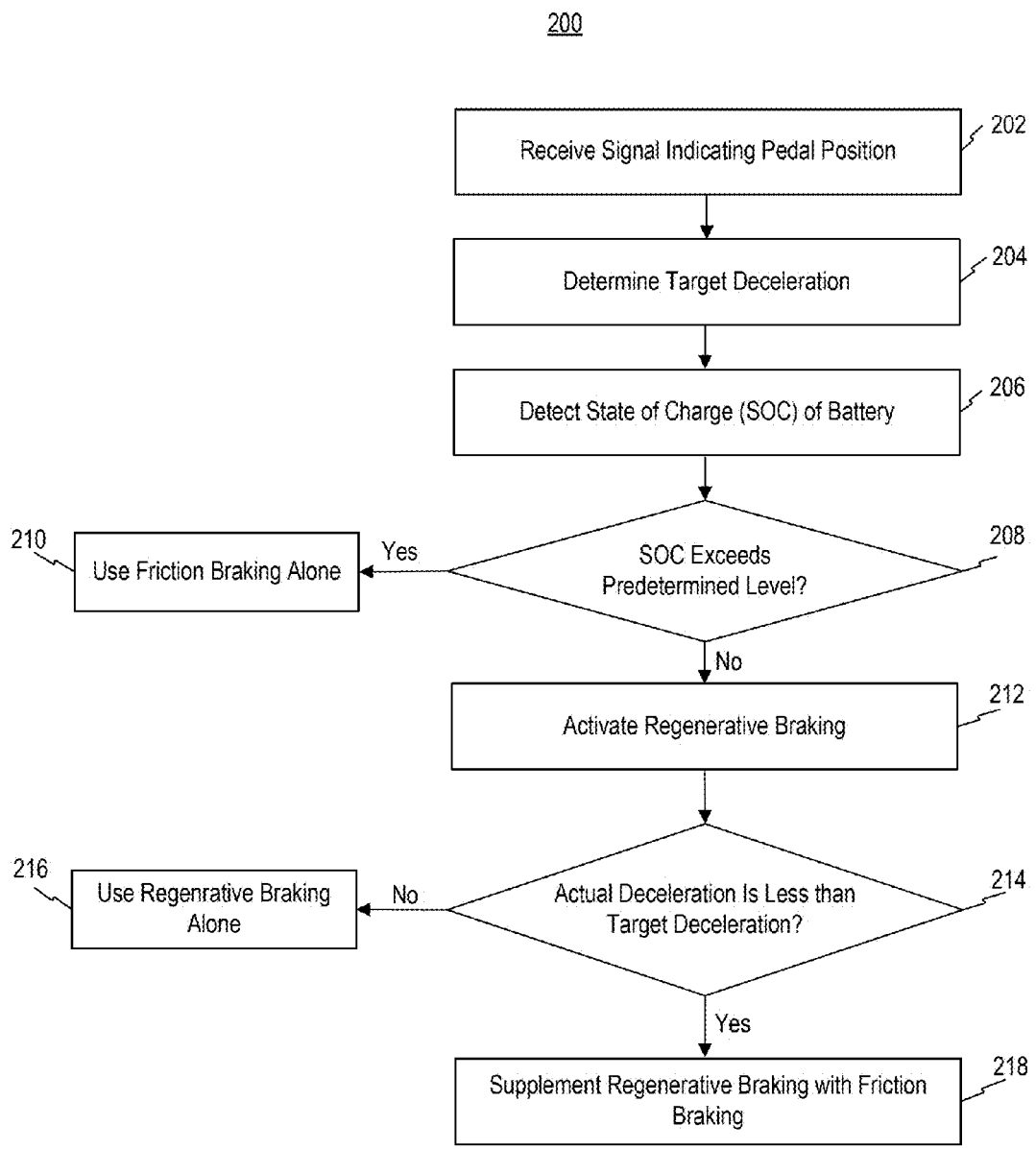
FIG. 2 is a flowchart of a braking control method for decelerating a vehicle, according to an exemplary embodiment.

FIG. 2 is a flowchart of a braking control method 200 for decelerating a vehicle, according to an exemplary embodiment. For example, method 200 may be performed by components of system 10, such as master braking module 100. Referring to FIG. 2, method 200 may include the following steps.

In step 202, master braking module 100 may receive a signal indicative of the amount of depression or the position of accelerator pedal 120. As described above, when the amount of depression is less than $D_{coast}$, the signal may function as a request for master braking module 100 to decelerate the vehicle.

In step 204, master braking module 100 may determine a target deceleration corresponding to the amount of depression. In some embodiments, master braking module 100 may store a predetermined corresponding relationship between the amount of depression and the target deceleration, and thus may determine the target deceleration according to the relationship. For example, master braking module 100 may query a lookup table indicative of the relationship to identify the corresponding target deceleration. For another example, the target deceleration may be expressed as a function of the amount of depression and master braking module 100 may compute the target deceleration based on the function.

In some embodiments, the target deceleration corresponding to a substantially zero pedal depression may be set to be the maximum deceleration achievable by RBS 130. This way, when the operator completely or near-completely releases accelerator pedal 120, the maximum amount of regenerative braking may be obtained. In some embodiments, user interface 170 may allow the operator to adjust the relationship between the target deceleration and the pedal position according to her preference.

Figure 3:
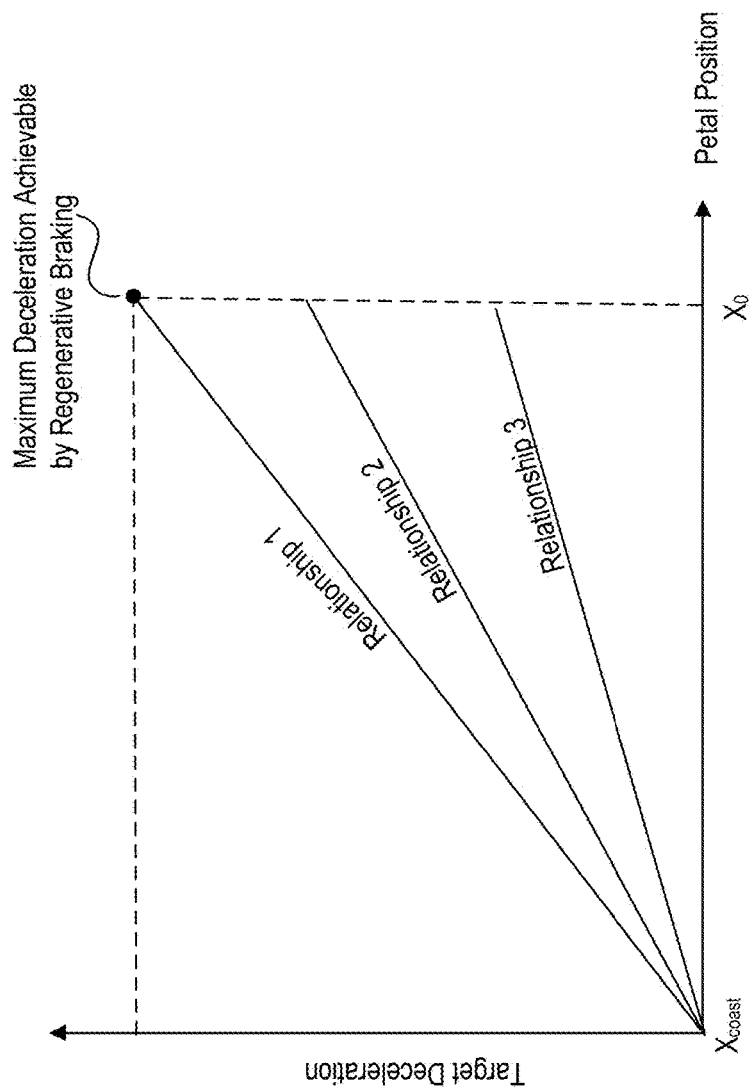
FIG. 3 is a schematic diagram illustrating exemplary relationships between the target deceleration of a vehicle and the amount of depression of an accelerator pedal.

In some embodiments, the target deceleration may be inversely proportional to the amount of depression. For example, FIG. 3 is a schematic diagram illustrating exemplary relationships in which the target deceleration of the vehicle is inversely proportional to the amount of depression of accelerator pedal 120. Referring to FIG. 3, the horizontal axis represents the position of accelerator pedal 120, with $x_{coast}$ denoting the pedal position that causes the vehicle to coast and $x_0$ denoting the pedal position at which accelerator pedal 120 is completely released. The vertical axis represents the target deceleration. Although the exemplary relationships illustrated in FIG. 3 are linear, it is contemplated that the relationships may also be non-linear.

Among the three relationships shown in FIG. 3, relationship 1 has the largest slope. According to relationship 1, the target deceleration at pedal position $x_0$ is the maximum deceleration achievable by the regenerative braking, which corresponds to the maximum regenerated power that the battery pack can accept. Master braking module 100 may use relationship 1 as the default relationship for determining the target deceleration. Moreover, the operator may adjust the relationship via user interface 170. For example, the operator may select relationship 3 for use by master braking module 100, so as to obtain a "softer" or less steep deceleration experience.

In step 206, master braking module 100 may detect a SOC of the battery pack. In some embodiments, master braking module 100 may query BMS 160 about the current SOC. In step 208, master braking module 100 may determine whether the SOC equals or is above a predetermined level, which corresponds to a fully or near-fully charged state of the battery pack. If yes, master braking module 100 may conclude the battery pack no longer needs regenerated power and it is undesirable to charge the battery pack. Thus, master braking module 100 may disable RBS 130 and use friction braking system 140 alone to achieve the target deceleration (step 210). Conversely, if the SOC is below the predetermined level, master braking module 100 may activate RBS 130 to decelerate the vehicle (step 212).

As described above, the amount of regenerative braking applied by RBS 130 may be limited by the SOC of the battery pack. Thus, in step 214, master braking module 100 may determine whether the actual deceleration of the vehicle is less than the target deceleration. For example, master braking module 100 may receive from speed sensor 150 signals indicating the velocity of the vehicle over time and determine the actual deceleration based on the change in velocity. Master braking module 100 may then compare the actual deceleration to the target deceleration.

If the actual deceleration equals or is larger than the target deceleration, master braking module 100 may use the regenerative braking alone to decelerate the vehicle (step 216). For example, when the actual deceleration is larger than the target deceleration, master braking module 100 may adjust RBS 130 to match the actual deceleration to the target deceleration, so as to provide consistent deceleration experience for the operator.

Conversely, if the actual deceleration is less than the target deceleration, master braking module 100 may conclude that both the regenerative braking and the friction brakes are needed to decelerate the vehicle. Accordingly, in step 218, master braking module 100 may engage friction braking system 140 to supplement the regenerative braking with the friction braking, until the target deceleration is achieved.

Figure 4B:
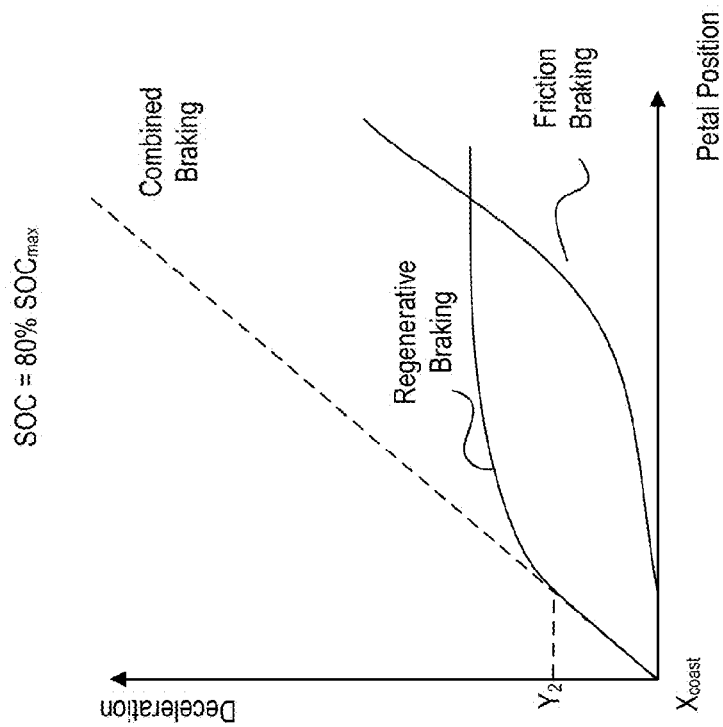
FIG. 4B is a schematic diagram illustrating an implementation of the method shown in FIG. 2, according to another exemplary embodiment.
Figure 4A:
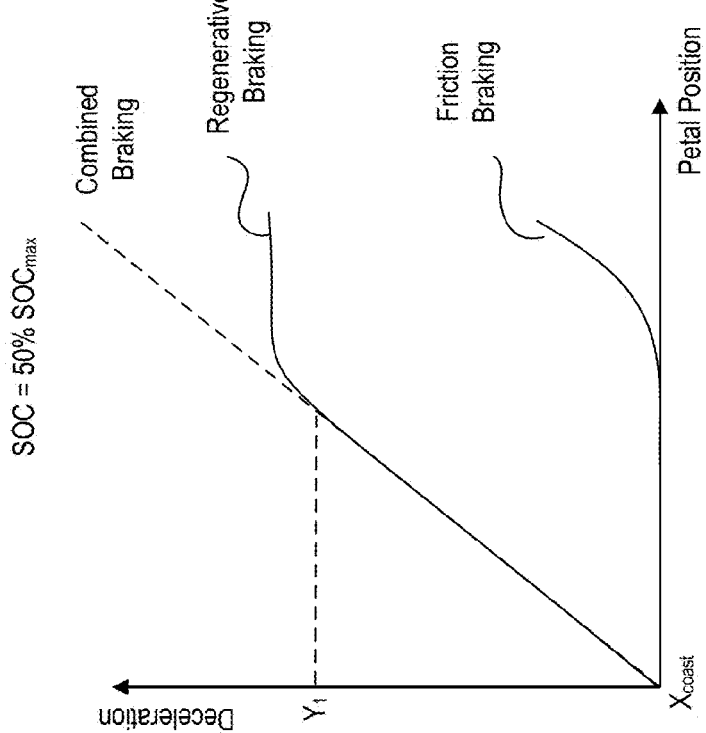
FIG. 4A is a schematic diagram illustrating an implementation of the method shown in FIG. 2, according to an exemplary embodiment.

FIG. 4A is a schematic diagram illustrating an implementation of method 200, according to an exemplary embodiment. Referring to FIG. 4A, master braking module 100 is configured to make the target deceleration inversely proportional to the amount of depression of accelerator pedal 120, similar to the examples shown in FIG. 3. When the SOC is at a modest level, e.g., at 50% of the maximum SOC level, the battery pack can accept relatively high regenerated power and RBS 130 can generate a relatively large braking torque. Accordingly, the maximum deceleration, $y_1$, produced by RBS 130 alone is relatively large. When the target deceleration exceeds $y_1$, master braking module 100 may supplement the regenerative braking with the friction braking, so that the combined braking may achieve the target deceleration.

FIG. 4B is a schematic diagram illustrating an implementation of method 200, according to another exemplary embodiment. Referring to FIG. 4B, when the SOC approaches its upper limit, e.g., at 80% of the maximum SOC level, the regenerated power acceptable by the battery pack decreases and so does the raking torque generated by RBS 130. Accordingly, the maximum deceleration, $y_2$, produced by RBS 130 alone is less than $y_1$. Moreover, when the target deceleration exceeds $y_2$, master braking module 100 needs to combine the regenerative braking with the friction braking to achieve the target deceleration.

In the above description, master braking module 100 determines whether to activate the friction brakes by comparing the actual deceleration of the vehicle to the target deceleration (step 214). In some embodiments, master braking module 100 may also determine whether to activate the friction brakes based on the SOC. For example, based on testing data, a lookup table may be built to list the maximum deceleration or braking torque achievable by RBS 130 under each given SOC. Then in a modified step 214, master braking module 100 may query the lookup table to determine the maximum deceleration corresponding to the SOC detected in step 206. If the maximum deceleration is less than the target deceleration, master braking module 100 may conclude that RBS 130 alone cannot produce enough braking torque and proceed to step 218. Otherwise, master braking module 100 proceeds to step 216.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed remote control system and related methods. Other embodiments will be apparent to those skilled in the art from consideration of the specification and practice of the disclosed remote control system and related methods. It is intended that the specification and examples be considered as exemplary only, with a true scope being indicated by the following claims and their equivalents.

What is claimed is:

1. A computer-implemented method for decelerating a vehicle, the method comprising:
   determining a target deceleration, wherein determining the target deceleration is based on a signal indicative of an amount of depression of an accelerator pedal;
   decelerating the vehicle by regenerative braking; and
   when determining that an actual deceleration by the regenerative braking is below the target deceleration, applying friction braking in addition to the regenerative braking to achieve the target deceleration;
   wherein a corresponding relationship between the amount of depression of the accelerator pedal and the target deceleration is set by an operator of the vehicle.

2. The method of claim 1, wherein decelerating the vehicle by the regenerative braking further comprises:
   activating the regenerative braking when an amount of depression of the pedal is below a predetermined amount.

3. The method of claim 1, the target deceleration is inversely proportional to the amount of depression.

4. The method of claim 1, further comprising:
   receiving a user input indicative of a relationship between the target deceleration and the corresponding amount of depression; and
   determining the target deceleration based on the relationship.

5. The method of claim 1, wherein the target deceleration corresponding to substantially zero depression of the accelerator pedal is a maximum deceleration achievable by the regenerative braking.

6. The method of claim 1, wherein the actual deceleration is determined based on a change in velocity.

7. The method of claim 6, further comprising a speed sensor configured to measure the velocity.

8. The method of claim 1,
   wherein the regenerative braking is configured to charge a battery of the vehicle; and
   wherein the actual deceleration is determined based on the state of charge of the vehicle.

9. The method of claim 1,
   wherein the regenerative braking is configured to charge a battery of the vehicle; and
   wherein the method further comprises:
      when the state of charge exceeds a predetermined level, disabling the regenerative braking; and
      generating the target deceleration solely by the friction braking.

10. A braking control device for a vehicle, the system comprising:
    a memory storing instructions; and
    a controller configured to execute the instructions to:

determine a target deceleration based on a signal indicative of an amount of depression of an accelerator pedal;

decelerate the vehicle by regenerative braking; and when determining that an actual deceleration by the regenerative braking is below the target deceleration, apply friction braking in addition to the regenerative braking to achieve the target deceleration;

wherein a corresponding relationship between the amount of depression of the accelerator pedal and the target deceleration is set by an operator of the vehicle.

11. The device of claim 10, wherein the controller is further configured to:

activate the regenerative braking when the amount of depression of the pedal is below a predetermined amount.

12. The device of claim 10, wherein the controller is further configured to:

receive a user input indicative of a relationship between the target deceleration and the corresponding amount of depression; and determine the target deceleration based on the relationship.

13. The device of claim 10, wherein the controller is further configured to:

receive a signal indicative of a velocity of the vehicle over time; and determine the actual deceleration based on a change in the velocity.

14. A vehicle, comprising:

a regenerative braking system;

a friction braking system;

a memory storing instructions an accelerator pedal configured to generate a signal indicative of an amount of depression of the accelerator pedal; and a controller configured to execute the instructions to:

determine a target deceleration based on the signal;

activate the regenerative braking system to decelerate the vehicle; and when determining that an actual deceleration achieved by the regenerative braking system is below the target deceleration, operate the friction braking system, in addition to the regenerative braking system, to achieve the target deceleration;

wherein a corresponding relationship between the amount of depression of the accelerator pedal and the target deceleration is set by an operator of the vehicle.

15. The vehicle of claim 14, further comprising:

a user interface configured to receive a user input indicative of a relationship between the target deceleration and the corresponding amount of depression;

wherein the controller is further configured to execute the instructions to:

determine the target deceleration based on the relationship.

16. The vehicle of claim 14, further comprising:

a speed sensor configured to measure a velocity of the vehicle;

wherein the controller is further configured to execute the instructions to:

determine the actual deceleration based on a change of the velocity.

17. A non-transitory computer-readable medium storing instructions which, when executed, cause one or more processors to perform a method for decelerating a vehicle, the method comprising:

determining a target deceleration based on a signal indicative of an amount of depression of an accelerator pedal;

decelerating the vehicle by regenerative braking; and when determining that an actual deceleration by the regenerative braking is below the target deceleration, applying friction braking in addition to the regenerative braking to achieve the target deceleration;

wherein a corresponding relationship between the amount of depression of the accelerator pedal and the target deceleration is set by an operator of the vehicle.

* * * * *